United States Patent [19]

Gollan

[11] Patent Number: 4,470,805
[45] Date of Patent: Sep. 11, 1984

[54] BAKING OVEN FOR FLAT BREAD

[76] Inventor: Harry Gollan, 41, Dizzengoff St., Tel-Aviv, Israel

[21] Appl. No.: 386,644

[22] Filed: Jun. 9, 1982

[51] Int. Cl.³ .............................................. F27B 9/16
[52] U.S. Cl. .................................... 432/138; 432/142; 432/147; 219/388; 219/411
[58] Field of Search ....................... 432/138, 142, 147; 126/19 R, 19 M, 41 R; 219/388, 411

[56] References Cited

U.S. PATENT DOCUMENTS 3,552,299  1/1971  Patoka ................................ 219/388
4,350,873  9/1982  Willett ................................ 432/138

FOREIGN PATENT DOCUMENTS 762831  9/1980  U.S.S.R. ............................ 432/138

Primary Examiner—Carroll B. Dority, Jr.
Attorney, Agent, or Firm—Ostrolenk, Faber, Gerb & Soffen

[57] ABSTRACT

A small-size, low capacity oven for baking flat bread, also called Syrian Bread, comprising a circular, dome-shaped rotatable table. The table is rotated about a vertical axis at about 1 r.p.m. A dome-shaped cover overlies the table, thus defining a confined space, heated by electric or fuel heaters mounted all around the cover. A chimney for exhaust gases is provided at the center of the cover in an adjustable manner for controlling the escape of gases from the oven.

4 Claims, 2 Drawing Figures

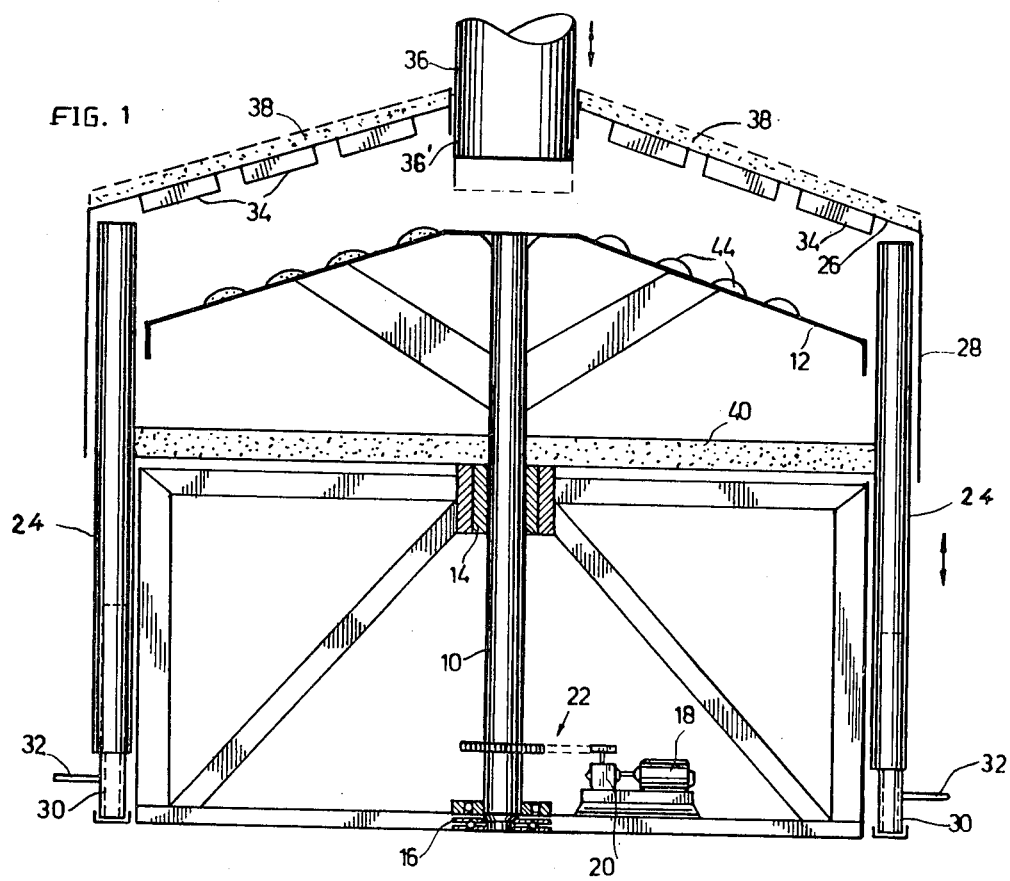
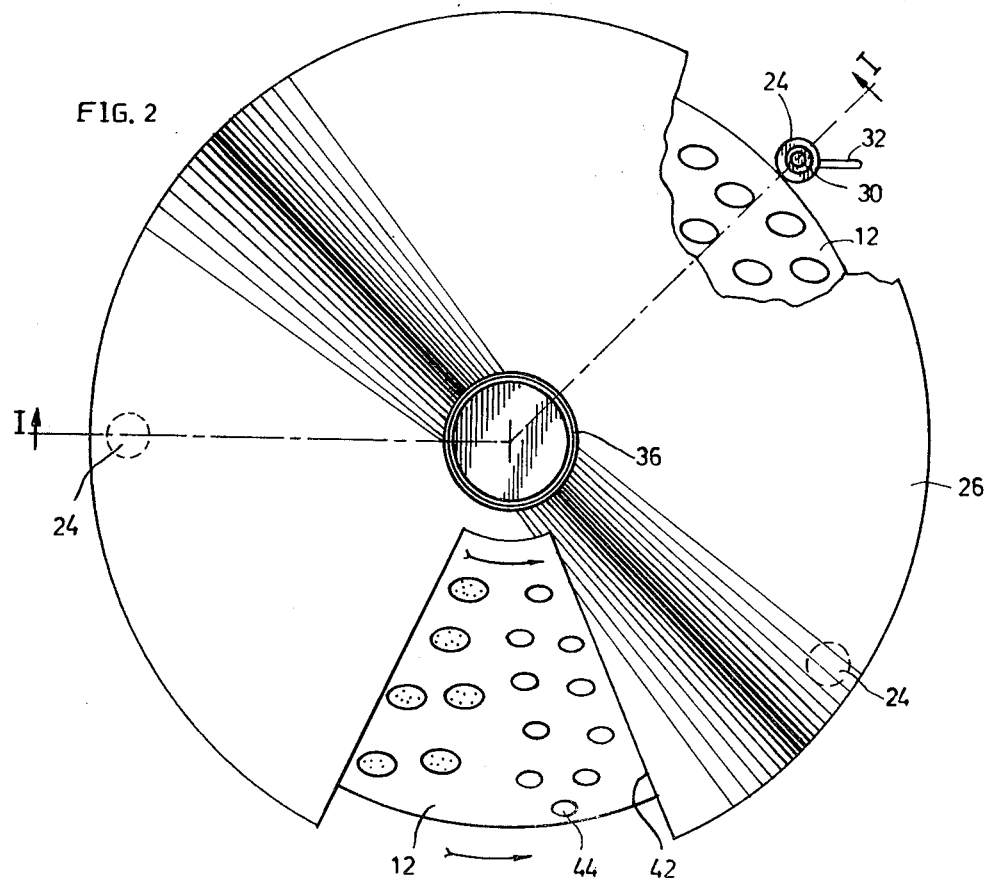

BAKING OVEN FOR FLAT BREAD

BACKGROUND OF THE INVENTION

The present invention relates to baking ovens, particularly for baking flat bread loaves (also known as "Pitah" or Syrian Bread). The invention is most useful for relatively small production capacity such as between 1000 and 2000 loaves per hour.

There are known various types of Pitah baking ovens, usually being of the endless-belt type.

As known in the Pitah baking industry, loaves, traveling on an endless belt within tunnel ovens are first subjected to intense high heat assuring the formation of an outer crispy reddish cover as well as an inner air pocket. Therefore, in baking installations the control of the heat versus transfer duration of the loaves is critical and requires careful design and performance which have been up to now only achieved with respect to large manufacturing systems.

It is the general object of the invention to provide small-size, low capacity ovens of simple construction which may readily be installed at any convenient location with minimum space requirements, such as small bakeries or even restaurants.

It is a further object of the invention to equip such small-size ovens with simple and effective control means.

It is a still further object of the invention to provide the oven with mainly three types of adjustment and control means, namely the distance between the heat source and the bread loaves; the duration of the baking phase; and the rate of hot gasses exhaustion from the oven heating space.

According to the invention it is provided an oven for baking flat bread such as Pitah, comprising a rotatably mounted support for the baked bread, means for rotating the support at a pre-determined speed, a cover overhanging the support defining a substantially confined space thereabove, heating means provided on said cover and hot gases exhaust means associated with said cover.

Preferably, the said support is made of sheet material and of cone-or dome-shape, and the said cover is of corresponding shape and measures.

The distance between the rotatable support and the cover, as well as the rate of hot gasses exhaust may be adjusted, by providing a vertically adjustable chimney as the center of the oven, allowing variable projection distance of the lower chimney end into the said heating space.

BRIEF DESCRIPTION OF THE DRAWINGS

These and further constructional features and advantages of the invention shall become more clearly understood in the light of the ensuing description of a preferred embodiment of the invention, given by way of example only with reference to the accompanying drawings wherein:

FIG. 1 is a cross-section along lines I—I of FIG. 2; and

FIG. 2 is a fragmental top view of the oven of FIG. 1.

DETAILED DESCRIPTION OF THE DRAWINGS

In FIG. 1 there is shown a central shaft 10 supporting a cone-shaped rotatable baking table 12. The shaft 10 is rotatably supported by an upper bearing 14 and a lower radial-as-well-as thrust-bearing 16. The rotation of the table 12 is effected by an electric motor 18, coupled to shaft 10 through a reduction gear box 20 by a sprocket or any other suitable driving means 22. The effective speed for baking Pitah has been found to be about one revolution per minute.

Around the central shaft supporting structure—which may be of any suitable kind—there are equidistantly located three support columns 24, carrying thereon cover 26 of the oven. The cover 26 is also cone- or dome-shaped, having a surrounding downwardly extending skirt portion 28. The columns 24 are telescopically supported on rotatably mounted screw-threaded posts 30 each extending into one of the columns 24, the arrangement being such that the rotation of the posts, e.g. by handle 32, will effect the raising or lowering of columns 24, i.e. of the cover 26.

Cover 26 is provided at its inner surface with heating means 34 such as infra-red electrical elements or gas fuel burners.

A chimney 36 is centrally located as shown above the cover 26, being essentially a length of pipe which is mounted by means (not shown) so as to be adjustably moved in the vertical direction; its lower end 36' may be projected into the space defined between the cover 26 and the table 12 to any pre-determined extent.

Finally there is provided suitable heat insulating layers around the outer surface of the cover (marked 38) and underside of the table (40), on top of the supporting structure of the central shaft 10, as shown.

The cover 26 is provided with a V-shaped opening 42 (see FIG. 2) through which the table 12 is accessible for loading and unloading bread loaves 44.

In operation of the oven according to the described embodiment of the present invention, the heaters 34 are operated and the table turned by the motor 18 until the environment thereof is heated to the required extent as known in the baking art. Supposing now that the table rotates in the counter clockwise direction as denoted by the arrow in FIG. 2, loaves 44 deposited on the table 12 start to enter the confined heating space between the table and the cover and are subjected to direct heating by the elements 34 for as-long-as the loaves travel under the cover 26. The intensity of heat within the space can be controlled by the following adjustments: The distance between the cover 26 and the table 12, regulated by the screw-threadably coupled posts 30 to the columns 24; by the angular velocity of the table about its central axis 10; by the extent by which the lower end of chimney 36' projects into the confined heating space of the oven, regulating the exhaust rate of hot gasses from such space (the lower the chimney, the less hot gasses escape. i.e. the temperature within the space will rise accordingly); and by controlling the heating elements 34 proper.

Experiments with the new oven, having a sheet metal table 12, heating capacity of about 10 KW/h and angular speed of 1 r.p.m. yielded a capacity of 2000 loaves per hour of high-quality, crispy Pitah bread, comparable if not superior to Pitah baked by conventional highly sophisticated and costly installations.

The invention therefore provides most effective solution for the middle and small-size bakeries or even restaurants, which may become self-contained in as-much-as Pitah supply is concerned.

Those skilled in the art will readily understand that various changes, modifications and variations of the construction may be employed or applied to the preferred embodiment herein disclosed without departing from the spirit and scope of the present invention, such changes should be deemed to fall within the ambit of the invention as defined in the appended claims.

What is claimed is:

1. An oven for baking flat bread such as Pitah, comprising a generally circular, cone-shaped, rotatably mounted support for bread loaves to be baked, means for rotating the support about a vertical axis at a predetermined speed, a cone-shaped cover overhanging the support for defining a substantially confined space thereabove, heating means provided on the cover, and hot gasses exhaust means associated with the cover comprising a centrally located chimney adjustably mounted on the cover, the chimney having a lower end which is adapted to project into the space to any predetermined extent.

2. The oven as claimed in claim 1 wherein the cover is mounted on adjustable lifting means.

3. The oven as claimed in claim 1 wherein the support is made of sheet metal.

4. The oven as claimed in claim 1 wherein the cover has a V-shaped cut-out providing an opening for loading and unloading the bread loaves.

* * * * *